United States Patent
Delp et al.

(10) Patent No.: US 8,061,136 B2
(45) Date of Patent: Nov. 22, 2011

(54) METHOD FOR OPERATING AN INTERNAL COMBUSTION ENGINE AND A CONTROL AND REGULATION DEVICE

(75) Inventors: Matthias Delp, Bad Abbach (DE); Gerhard Eser, Hemau (DE)

(73) Assignee: Continental Automotive GmbH, Hannover (DE)

( * ) Notice: Subject to any disclaimer, the term of this patent is extended or adjusted under 35 U.S.C. 154(b) by 545 days.

(21) Appl. No.: 12/194,908

(22) Filed: Aug. 20, 2008

(65) Prior Publication Data
US 2009/0050118 A1 Feb. 26, 2009

(30) Foreign Application Priority Data
Aug. 22, 2007 (DE) .......................... 10 2007 039 613

(51) Int. Cl.
*F02D 23/00* (2006.01)
*F02D 13/00* (2006.01)
(52) U.S. Cl. ........ 60/602; 123/345; 123/347; 123/90.15
(58) Field of Classification Search .................. 60/605.1, 60/602; 123/345, 346, 347, 348, 90.15
See application file for complete search history.

(56) References Cited

U.S. PATENT DOCUMENTS

| | | | | |
|---|---|---|---|---|
| 5,230,320 A | * | 7/1993 | Hitomi et al. | 123/90.15 |
| 7,318,314 B2 | * | 1/2008 | Pagot et al. | 60/605.1 |
| 7,730,874 B2 | * | 6/2010 | Leduc et al. | 123/432 |
| 2008/0190405 A1 | * | 8/2008 | Eser et al. | 123/90.15 |

FOREIGN PATENT DOCUMENTS

| | | | |
|---|---|---|---|
| DE | 102004030605 | | 6/2004 |
| DE | 102004061110 | | 12/2004 |
| DE | 102004061110 | * | 6/2006 |
| JP | 05086913 A | * | 4/1993 |

* cited by examiner

*Primary Examiner* — Mary A Davis
(74) *Attorney, Agent, or Firm* — King & Spalding L.L.P.

(57) ABSTRACT

An internal combustion engine (30) with a supercharger device (50, 52) for increasing the charging pressure in an air inlet system (33) has a number of cylinders (32). Each cylinder (32) has at least one exhaust valve (36) which is connected to the exhaust system (40) and at least one inlet valve (34), which is connected to the air inlet system (33). Scavenging is carried out with a valve overlap between the inlet valve (34) and the exhaust valve (36). For controlling the operation of the internal combustion engine the system monitors whether the scavenging was successful.

15 Claims, 3 Drawing Sheets

METHOD FOR OPERATING AN INTERNAL COMBUSTION ENGINE AND A CONTROL AND REGULATION DEVICE

CROSS-REFERENCE TO RELATED APPLICATIONS

This application claims priority to German Patent Application Number 10 2007 039 613.0 filed on Aug. 22, 2007, and which is incorporated herein by reference in its entirety.

TECHNICAL FIELD

The invention relates to a method for control of the operation of an internal combustion engine with a supercharger and to a control and regulation device.

BACKGROUND

With modern internal combustion engines the required combustion air is often supplied to the cylinders via a supercharger with a pressure increased in relation to the ambient pressure. The pressure increase required for this can in this case typically be achieved by using a so-called mechanical supercharger. This is driven via the crankshaft of the internal combustion engine.

Also known is the practice of increasing the pressure via a so-called exhaust gas turbocharger. In this case a turbo compressor is driven with the aid of a turbine connected to the exhaust system which ensures an increase in pressure on the air inlet side of the cylinders. For this type of turbocharging it is however also known that at low engine speeds and the associated low mass throughputs a so-called turbo lag occurs. The efficiency of the turbocharger is then low in this operating range and only a relatively small motor torque can be achieved at full load.

Such a turbocharger and its use in an internal combustion engine are for example known from DE 10 2004 030 B3. This document is based on control of the internal combustion engine with a turbocharger in which, depending on a requested torque, the inlet and exhaust valves are adjusted so that these are opened simultaneously for a predetermined time, meaning that their timing overlaps. With a four-stroke engine, this valve overlapping occurs towards the end of the 4th stroke on expulsion of the exhaust gas and continues into the 1st stroke of the induction, so that the inlet valve is already open before the exhaust valve is completely closed. This means that the accelerated exhaust gas column in the exhaust manifold causes fresh fuel-air mixture to be sucked into the combustion chamber and reduces the likelihood of exhaust gas remaining in the combustion chamber.

With high-performance engines the exhaust valve opens even before bottom dead center is reached, this relaxes the gas column early, so that the subsequent upwards movement of the piston is not so heavily braked. During this upwards movement the inlet valve then also opens, so that, as mentioned, both are now simultaneously opened. Since the gas mixture has however been sharply accelerated in the direction of the exhaust valve no air is pushed back at the inlet valve, but a flushing process takes place which is also promoted by a large valve acceleration which additionally carries air with it. The exhaust valve ideally closes when the air column comes to a standstill. The inlet valve likewise remains open until the air column which is sucked in by the upwards movement of the piston comes to a standstill. Since the air is sluggish to a certain extent at high engine speeds, it now compresses itself against the piston which is already moving upwards again. This additional compression brings about a better filling.

With this process, which is also referred to as scavenging, a fall in pressure occurs from the inlet side to the outlet side across the cylinders so that a flushing through of inlet air to the exhaust side occurs. The result is that any turbo lag occurring is reduced. To increase the accuracy with which the mass of air actually remaining in the cylinder can be determined during or after a scavenging process, it is additionally proposed, if the actual Lambda value deviates from Lambda setpoint value, for a valve overlap to correct the value for the opposing exhaust pressure as a function of the deviation established.

SUMMARY

According to various embodiments, in a method for control of the operation of an internal combustion engine and in a control and regulation device, the occurrence of operational problems such as especially a delayed combustion, misfires or undesirably high knocking of the internal combustion engine can be reduced.

According to an embodiment, a method for controlling the operation of an internal combustion engine with a supercharger device to increase the charge pressure in an air inlet system, with at least one cylinder, with each cylinder having at least one exhaust valve which is connected to an exhaust system and at least one inlet valve, which is connected to the air inlet system, with a valve overlap between the inlet valve and the exhaust valve being set so that scavenging is performed, may comprise the step of monitoring and evaluating the scavenging.

According to a further embodiment, the method may also comprise the steps of detecting a scavenging variable, comparing the scavenging variable to a setpoint value and evaluating the scavenging on the basis of the comparison. According to a further embodiment, a value of a scavenging variable can be detected and may be compared to a setpoint value, wherein on deviation of the scavenging variable from the setpoint value the valve overlap can be reduced. According to a further embodiment, the valve overlap can be set so that the knocking of the internal combustion engine lies in a predetermined range. According to a further embodiment, the scavenging variable can be an opening cross section of a bypass valve, especially of a wastegate. According to a further embodiment, an output signal of a mixture control can be used as the flushing variable. According to a further embodiment, a knocking signal of a knock sensor can be used as the scavenging variable. According to a further embodiment, misfires can be used as the scavenging variable.

According to another embodiment, in a control and regulation device for controlling and regulating the operation of an internal combustion engine with a supercharging device for increasing the charging pressure in an air inlet system, with a number of cylinders, with each cylinder having at least one exhaust valve, which is connected to the exhaust system and at least one inlet valve, which is connected to the air inlet system, and with a controls and regulation device for controlling and regulating the operation of the internal combustion engine, the control and regulation device is operable to monitor and evaluate a valve overlap between the inlet valve and the exhaust valve for scavenging.

BRIEF DESCRIPTION OF THE DRAWINGS

Further advantages and advantageous embodiments are the subject matter of the figures below, as well as their associated descriptive parts.

In detail the figures show.

DETAILED DESCRIPTION

Figure 1:
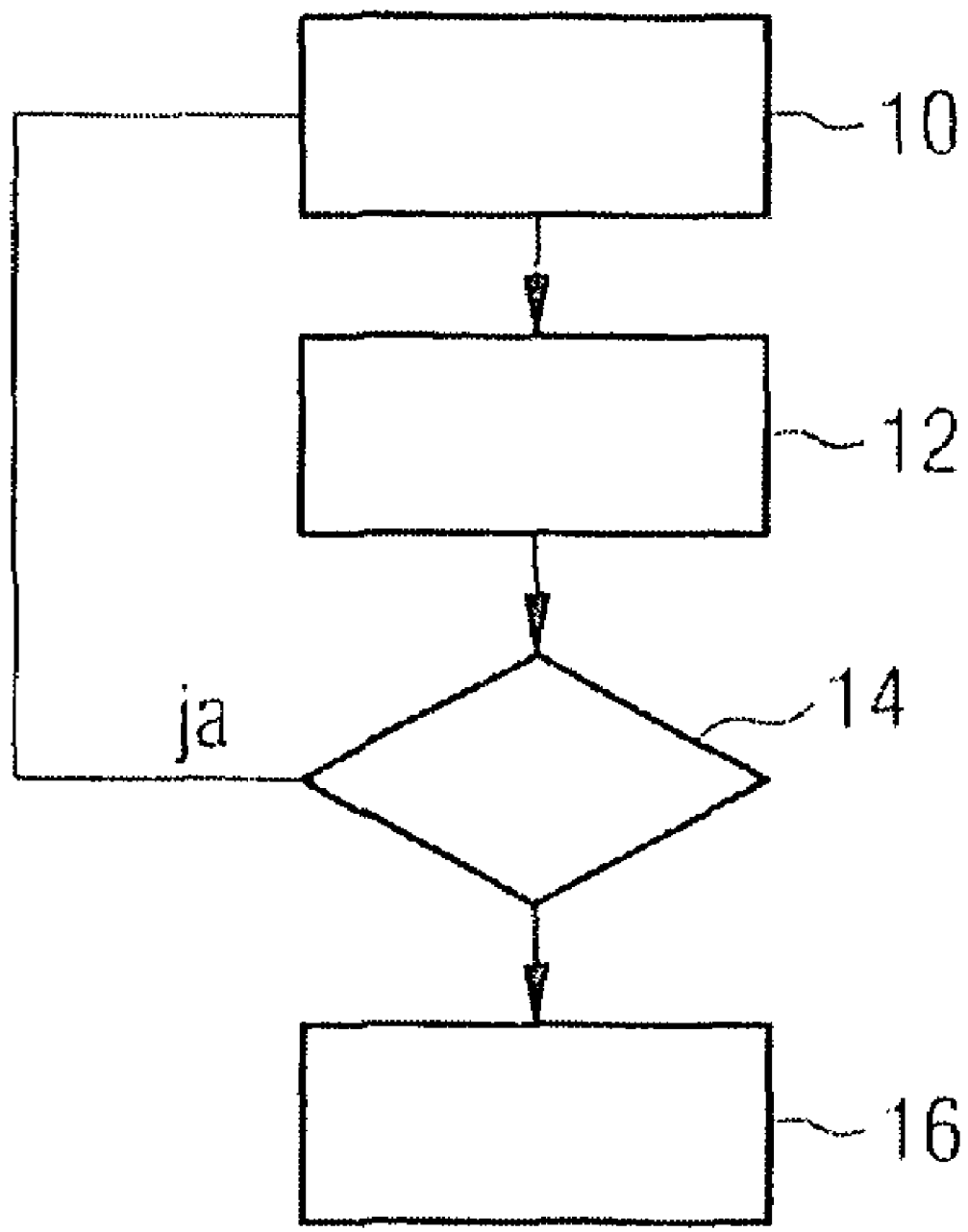
FIG. 1: a schematic diagram of the execution sequence of the method according to an embodiment.

According to various embodiment, basically scavenging is thus monitored to the extent of whether it has been sufficiently or successfully carried out. To this end, a scavenging variable can especially be monitored, from which a conclusion about a sufficient or an insufficient scavenging can be drawn.

If it is established that the scavenging was not successful, if for example it can be concluded from the value of the monitored scavenging variable that the scavenging was not sufficient or successful, then according to an embodiment the scavenging is no longer requested in the following step. This means that the only valve overlaps requested or permitted respectively by the control unit are those for which it is guaranteed that no operational problems will occur as a result of the valve overlap.

In particular large valve overlaps can be avoided by this so that a flushing of exhaust gas back into the combustion chamber is largely prevented. This means that the valve overlap is set so that knocking of the internal combustion engine lies within a predetermined acceptable range. In addition the valve overlap can also be set so that a trouble-free functioning of the internal combustion engine is guaranteed.

For monitoring of the scavenging a so-called scavenging variable can be observed. This allows monitoring of the scavenging process to be achieved with wastegate controllers provided in turbocharged engines, so that this is suitable for detecting the scavenging variable.

Since the mixture controller reacts to a change of fresh air composition in the cylinder, this can likewise be used for determination of a scavenging variable.

The knocking with internal combustion engines points to an undesired uncontrolled combustion or a self-ignition of the fuel. In order to prevent or reduce this, so-called knocking interventions are provided in the control of the internal combustion engine, with which for example the ignition point is suitably adjusted. This is often implemented in modern internal combustion engines by an electronic knock control, in a further embodiment an increased tendency to knocking can be detected and exploited to establish the success of a scavenging process carried out.

Obviously a number of scavenging variables can also be monitored simultaneously.

With the method the operational safety and lifetime of the internal combustion engine can be improved in a simple manner by utilizing components already present in the internal combustion engine.

It has turned out that the drop in pressure during scavenging over the cylinders can actually be smaller than expected, so that a smaller amount of fresh gas is scavenged. This means that scavenging is not successful overall and the desired improvement in relation to the turbo lag is not produced. A drop in pressure which is too low can even lead to exhaust gas flowing back into the combustion chamber and forcing out fresh gas there. This is accompanied by a lower performance of the internal combustion engine. Heavy knocking can also occur which can also lead to damage to the engine.

FIG. 1 shows a schematic diagram of the execution sequence of the method according to an embodiment. The starting point in this case is a state of the internal combustion engine in which a defined initial state obtains. In particular the engine speed at which scavenging is activated may not be greater than a predetermined threshold value. Furthermore the scavenging process must already last for a sufficiently long time. In the request step 10 scavenging is then requested, so that a fall in pressure from the inlet side to the outlet side across the cylinders is to occur. This is monitored in monitoring step 12, with which a scavenging variable can be detected. This scavenging variable is selected so that, with the evaluation of its value or of the graph of the value over time, a conclusion can be drawn as to whether scavenging was sufficient or successful. As is explained in greater detail in conjunction with FIGS. 2 to 4, values of the wastegate controller, of the mixture controller or values for the knocking or the knocking tendency can be detected as scavenging variables for example.

After the flushing variable is detected in monitoring step 12, it is determined in comparison step 14 whether sufficient scavenging has taken place. If it has, the scavenging can continue to be monitored. If it is detected in comparison step 14 that the scavenging has not taken place or not taken place sufficiently, measures are taken in step 16 which cause no further scavenging to be requested. The result which can be achieved in particular is that wide valve overlaps are avoided. Thus for example only such valve overlaps are requested or permitted by the control unit for which it is guaranteed that an operating problem of the internal combustion engine, especially knocking or a drop in performance, does not occur. In this way a flushing of exhaust gas back from the exhaust gas tract can be prevented and thereby the danger of damage to the internal combustion engine reduced.

Figure 2:
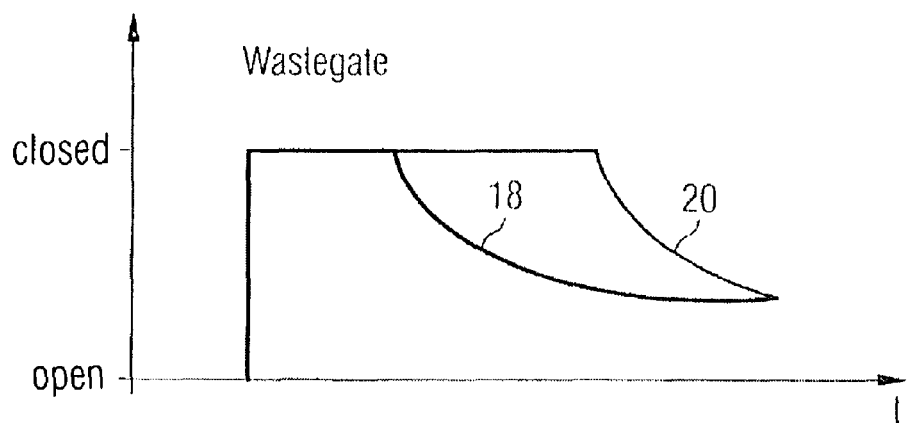
FIG. 2: a schematic diagram of the graph of the value at the wastegate.

Different variables can be monitored individually or in combination as scavenging variables. To this end a bypass valve provided for charge pressure regulation, the so called wastegate, can be monitored in the exhaust flow. This is because as soon as the setpoint pressure is reached after a specific scavenging time in the induction manifold, a specific exhaust gas mass must be able to flow out via the wastegate. To this end the wastegate is opened using a regulation algorithm. In FIG. 2 the line 18 shows the time gradient of the wastegate from completely closed setting to the completely open setting for a situation in which the setpoint pressure is being established as required. Thus the result of the wastegate regulation shows that scavenging was successful in this case. The line 20 schematically depicts a situation in which the setpoint pressure in the induction manifold cannot be achieved or cannot be achieved in time. This means that an insufficient mass flow reaches the turbine of the turbocharger and the wastegate remains closed, at least for a longer period. The scavenging was not successful.

To check the scavenging function a reference line in accordance with line 18 for the opening state of the bypass valve is stored in a data memory of the control and regulation device of the internal combustion engine. During the scavenging the time gradient of the opening state of the bypass valve is recorded in accordance with line 20 and compared to the stored reference line. If the result of the comparison is that the opening state of the bypass valve is smaller than the reference value in at least a defined period by a defined value, a malfunction of the scavenging is detected.

Figure 3:
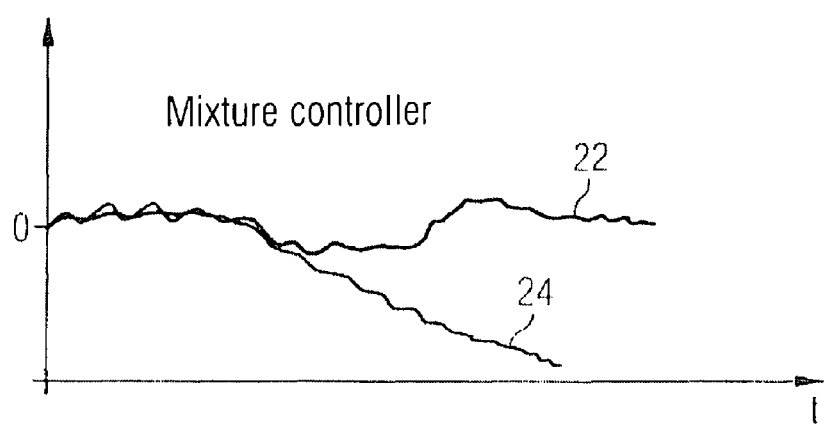
FIG. 3: a schematic diagram of the graph of the value at the mixture controller.

Basically the mixture controller takes care of the respective ratio of fuel and air. For the case in which the air located in the cylinder changes through a backflushing of the fresh air proportion, the mixture controller is activated and adjusts in the direction of a leaner mixture. A leaner mixture refers to the setting of an air/fuel mixture in which less fuel is contained. This can be detected during scavenging, so that change in values of the mixture controller can be used as a scavenging variable. FIG. 3 is thus shows a further schematic diagram of an option for monitoring scavenging. In this diagram the curve 22 of the mixture controller over time schematically depicts a situation in which scavenging is executing sufficiently and accordingly the mixture controller is essentially controlling the mixture as a constant. A situation in which the mixture controller makes the mixture leaner is shown in FIG. 3, with the curve 24, in which the ratio between air and fuel of the air/fuel mixture becomes greater, i.e. the percentage proportion of fuel becomes smaller. This can be brought about for example by exhaust gas being flushed back into the cylinder, which allows it to be concluded that the scavenging has not been sufficient.

The correct functioning of the scavenging with reference to the mixture controller is checked in the manner of reference values for an output signal of the mixture controller being stored for a correct scavenging in a data memory. The reference values in this case for example can for example correspond to the curve 22 of FIG. 3. In addition the output of the mixture controller is recorded during the scavenging, as is shown for example with reference to curve 24 in FIG. 3, and is compared to the reference curve. If the result of the comparison is that the output signal of the mixture controller is detected in the direction of a reduction of the percentage proportion of the fuel in the air/fuel mixture, which is being supplied to the internal combustion engine, then a malfunction of the scavenging process is detected.

Figure 4:
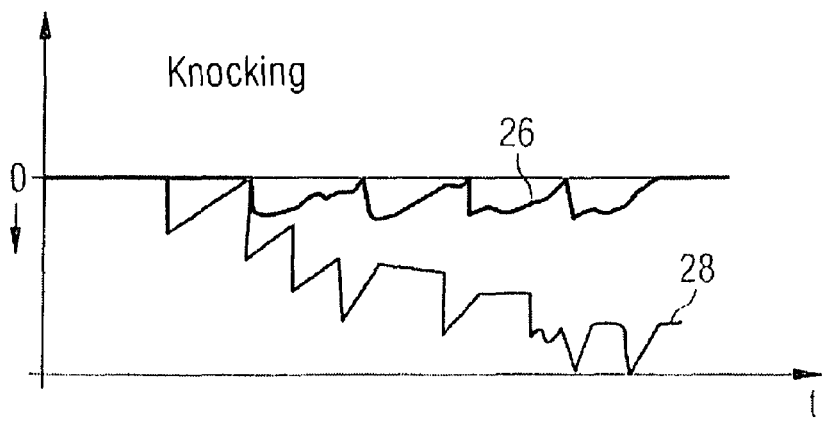
FIG. 4: a schematic diagram of the graph of the values for knocking.

A further example for the option of observing the scavenging is shown in FIG. 4. This makes use of the fact that a bad scavenging increases the residual gas proportion in the cylinder. Thus the ignition point set is no longer within the optimum range. This in its turn leads, because of the hot exhaust gas in the cylinder, to an increased tendency to knocking. Once again this can be utilized for detecting insufficient scavenging. This is because, to counter knocking in internal combustion engines, different measures can be executed which are implemented in modern internal combustion engines by an electronic knock control. This electronic control can subsequently be checked as to how frequently an intervention is necessary. If this frequency for this operating point lies above a threshold value which is defined for the frequency of interventions under normal operation, this allows it to be established that the scavenging has been insufficiently executed. The curve 26 in FIG. 4 shows a graph of the knocking with the time t with sufficient scavenging. Curve 28 by contrast shows the graph of knocking with insufficient scavenging.

To check the scavenging function a reference curve can be stored for the knocking signal of a knock sensor in a data memory. This reference signal can for example correspond to curve 26 of FIG. 4. In addition the knock sensor signal is detected during scavenging. The detected signal can for example correspond to curve 28 which indicates an increased tendency to knocking. By comparing the actual value of the knock sensor with the stored reference value a malfunction of the flushing process is detected if the actual values are displaced in the direction of detecting a tendency to knocking.

As well as the scavenging variables given in conjunction with FIG. 2 to 4, further variables able to be detected in the internal combustion engine can also be used, provided the scavenging can be at least deduced qualitatively from these variables.

Instead of the knocking signal for example, misfires can be used for monitoring the scavenging function. The misfires can for example be detected via uneven running of the internal combustion engine or via the cylinder pressure with the aid of a cylinder pressure sensor. In this case, as with the knocking signal, a corresponding reference signal for the uneven running and/or the cylinder pressure can be stored. The uneven running detected and the cylinder pressure curve detected are compared to the corresponding reference value. Through the comparison with the stored reference value a malfunction of the flushing process is detected, if the initial values differ by a defined value from the reference values. This means that misfires for example can also be used via the uneven running or via the cylinder pressure for example to monitor the flushing function.

Figure 5:
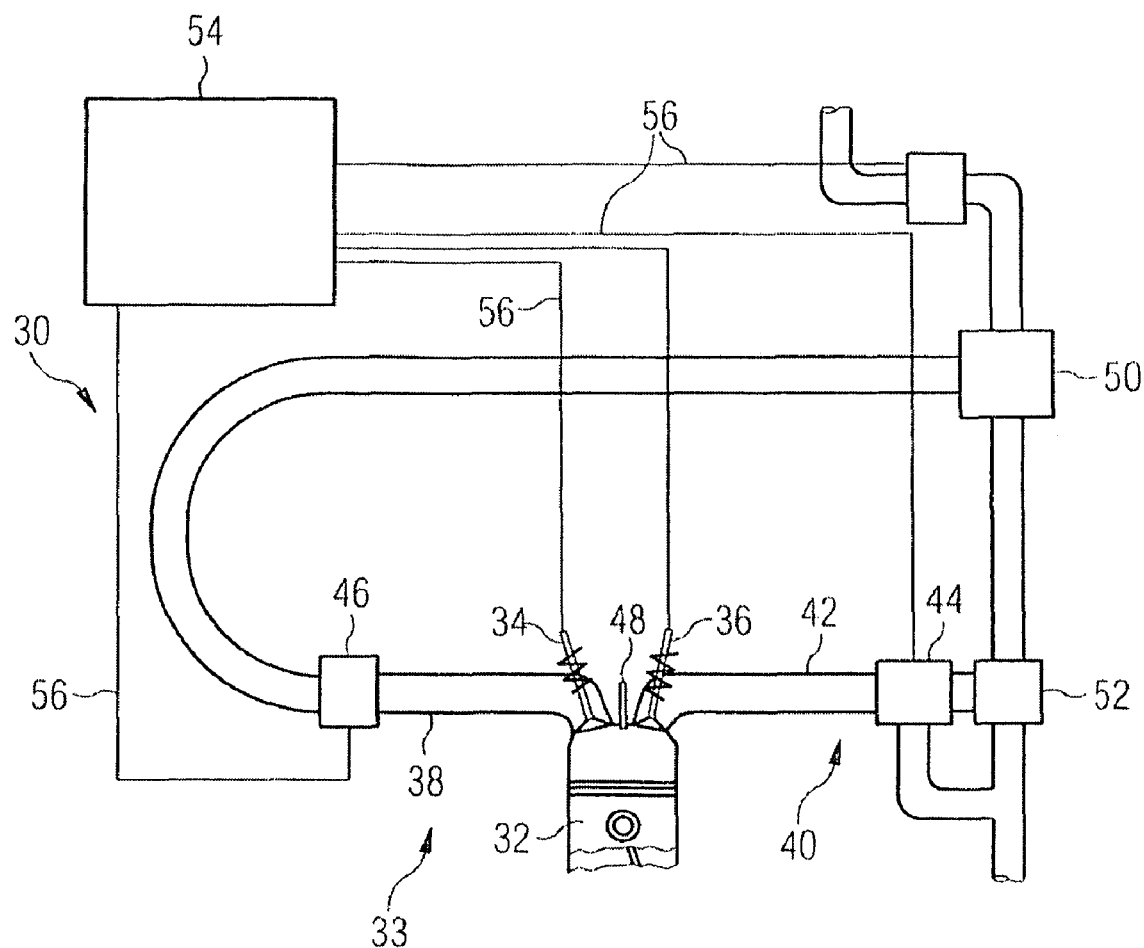
FIG. 5: a schematic diagram of an internal combustion engine.

FIG. 5 shows a schematic cross-sectional diagram of a part of an internal combustion engine 30. This comprises a number of cylinders, of which one cylinder 32 is shown in FIG. 5. The cylinder 32 has an inlet valve 34 connected to an induction manifold 38, via which fresh air arrives via the air inlet system 33 in the cylinder 32. For control of the fresh air mass a throttle flap 46 is arranged in front of the inlet valve 34 in the induction manifold 38. Arranged in a combustion chamber is a schematically shown injection valve 48, via which the fuel can be injected.

The hot combustion gases arrive via an exhaust valve 36 in the exhaust system 40 which features an exhaust pipe 42. Furthermore a bypass valve, a so-called wastegate 44 is also provided in the exhaust system 40, via which the specific exhaust mass can flow out, as soon as the setpoint pressure is reached after a specific scavenging time in the induction manifold. A turbine 52 is provided in the exhaust system. This is driven by the exhaust gas supplied to it and for its part drives a compressor 50. The compressor 50 is connected to the throttle flap 40 and can thus compress the air to be supplied to the cylinder 32. In this case the combination of turbine 52 and compressor 50 is referred to as a turbocharger.

The operation of the internal combustion engine 30 can be controlled and regulated with a control and regulation device 54. To this end the control and regulation device 54 is connected to the required components, especially the throttle flap 46, the inlet valve 34, the exhaust valve 36, the wastegate 44 of the internal combustion engine via control lines 56 so that these components can be controlled and regulated. The control and regulation device 54 receives information via different sensors about the current operating state of the internal combustion engine 30, for example information about the opening position of the bypass valve (wastegate), the knocking signal of a knock sensor or the output signal of a mixture controller. These variables can thus be used as scavenging variables, with which a valve overlap of the inlet valve 34 and of the exhaust valve 36 and thereby the scavenging can be monitored and evaluated. In particular the monitored variables can be compared with a setpoint value and the scavenging can then be evaluated on the basis of the comparison. On deviation from a predetermined setpoint value the valve overlap can be changed, especially reduced, so that a change of the value in the direction of the setpoint value is achieved.

The valve overlap between the inlet valve 34 and the exhaust valve 36 can for example be adjusted steplessly using a so-called IVVT (infinitely variable valve timing) system.

What is claimed is:
1. A method for controlling the operation of an internal combustion engine with a supercharger device to increase the charge pressure in an air inlet system, with at least one cylinder, with each cylinder having at least one exhaust valve which is connected to an exhaust system and at least one inlet valve, which is connected to the air inlet system, with a valve overlap between the inlet valve and the exhaust valve being set so that scavenging is performed, the method comprising the steps of:

- detecting a scavenging variable,
- comparing the scavenging variable to a setpoint value; and
- evaluating the scavenging on the basis of the comparison, wherein the scavenging variable is a value change of an output signal of a mixture controller, and wherein on deviation of the scavenging variable from the setpoint value the valve overlap is reduced.

2. The method according to claim 1, wherein the valve overlap is set so that a knocking of the internal combustion engine lies in a predetermined range.

3. The method according to claim 1, further comprising a second scavenging variable comprising of an opening cross section of a bypass valve.

4. The method according to claim 1, further comprising a second scavenging variable comprising of an opening cross section of a wastegate.

5. The method according to claim 1, wherein reference values for the output value of the mixture controller are stored and compared with measured output values.

6. The method according to claim 1, further comprising a knocking signal of a knock sensor is used as a second scavenging variable.

7. The method according to claim 1, wherein misfires are used as a second scavenging variable.

8. A control and regulation device for controlling and regulating the operation of an internal combustion engine with a supercharging device for increasing the charging pressure in an air inlet system, with a plurality of cylinders, with each cylinder having at least one exhaust valve, which is connected to the exhaust system and at least one inlet valve, which is connected to the air inlet system, and with a controls and regulation device for controlling and regulating the operation of the internal combustion engine, wherein the control and regulation device is configured:

- to detect a scavenging variable,
- to compare the scavenging variable to a setpoint value; and
- to evaluate the scavenging on the basis of the comparison, wherein the scavenging variable is a value change of an output signal of a mixture controller, and wherein on deviation of the scavenging variable from the setpoint value the valve overlap is reduced.

9. An internal combustion engine comprising
- a supercharger device to increase the charge pressure in an air inlet system,
- a mixture controller generating an output signal;
- at least one cylinder having at least one exhaust valve which is connected to an exhaust system and at least one inlet valve which is connected to the air inlet system, wherein a valve overlap between the inlet valve and the exhaust valve is set so that scavenging is performed, and
- a control device configured
  - to detect a scavenging variable,
  - to compare the scavenging variable to a setpoint value; and
  - to evaluate the scavenging on the basis of the comparison, wherein the scavenging variable is a value change of the output signal of the mixture controller, and wherein on deviation of the scavenging variable from the setpoint value the valve overlap is reduced.

10. The internal combustion engine according to claim 9, wherein the control device is operable to set the valve overlap so that a knocking of the internal combustion engine lies in a predetermined range.

11. The internal combustion engine according to claim 9, further comprising a second scavenging variable comprising of an opening cross section of a bypass valve.

12. The internal combustion engine according to claim 9 further comprising a second scavenging variable is an opening cross section of a wastegate.

13. The internal combustion engine according to claim 9, wherein reference values for the output value of the mixture controller are stored and compared with measured output values.

14. The internal combustion engine according to claim 9, further comprising a knocking signal of a knock sensor is used as a second scavenging variable.

15. The internal combustion engine according to claim 9, wherein misfires are used as a second scavenging variable.

* * * * *